(12) United States Patent
Loyd

(10) Patent No.: US 7,564,796 B2
(45) Date of Patent: Jul. 21, 2009

(54) METHOD AND SYSTEM FOR MANAGING A NETWORK SLOWDOWN

(75) Inventor: Aaron J. Loyd, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 650 days.

(21) Appl. No.: 10/953,280

(22) Filed: Sep. 30, 2004

(65) Prior Publication Data

US 2006/0072479 A1  Apr. 6, 2006

(51) Int. Cl.
*H04L 12/28* (2006.01)
(52) U.S. Cl. .................... 370/248; 370/242; 709/224
(58) Field of Classification Search ................ 370/241, 370/252, 253, 351, 246, 229, 237, 238, 248, 370/242; 709/224–226
See application file for complete search history.

(56) References Cited

U.S. PATENT DOCUMENTS

| 5,726,979 A * | 3/1998 | Henderson et al. ......... 370/254 |
| 5,870,557 A * | 2/1999 | Bellovin et al. ............. 709/224 |
| 6,292,494 B1 * | 9/2001 | Baker et al. .................. 370/459 |
| 6,492,910 B1 * | 12/2002 | Ragle et al. ............ 340/870.02 |
| 7,227,843 B2 * | 6/2007 | Belanger et al. ............. 370/237 |
| 2003/0115319 A1 * | 6/2003 | Dawson et al. .............. 709/224 |
| 2004/0098502 A1 * | 5/2004 | Xu et al. ...................... 709/238 |
| 2006/0023638 A1 * | 2/2006 | Monaco et al. ............. 370/252 |
| 2006/0045011 A1 * | 3/2006 | Aghvami et al. ............ 370/230 |

FOREIGN PATENT DOCUMENTS

| WO | WO 99/04533 | 1/1999 |
| WO | WO 03/053015 A1 | 6/2003 |

* cited by examiner

*Primary Examiner*—Ricky Ngo
*Assistant Examiner*—Gary Mui

(57) ABSTRACT

A system and method are disclosed for managing a network slowdown. The method includes measuring a time for a packet to travel from a source node over a given path to a destination node in the network; comparing the time with a threshold for the path; and generating an event when the time exceeds the threshold, wherein the event identifies a hop along the path which exceeds a hop limit within the path.

29 Claims, 3 Drawing Sheets

METHOD AND SYSTEM FOR MANAGING A NETWORK SLOWDOWN

BACKGROUND

Network management systems, such as Hewlett Packard's OpenView™ Performance Insight (OVPI) provide an ability to monitor a network for the occurrence of failed connections between nodes. Failed connections can be monitored as a function of various network parameters. The network parameters can, for example, include parameters stored at routers of the network, and can indicate such variables as the number of packet collisions and/or corrupted packets.

Routers are included in a network to provide connectivity between nodes and to facilitate network communications. Routers can include local tables which, for example, monitor the number of packet collisions. The packet collisions parameter can be compared to a threshold limit value which, when exceeded, can be used to generate an event such as a simple network management protocol (SNMP) event. The comparison can, for example, be performed in the router or within a management station of the network.

Network management systems are known to also include a tool for tracing the route of a packet, for use in measuring the performance of a given path. Management systems can use the monitored parameters, such as the number of packet collisions and/or corrupted packets, to gauge network performance of a given path. The use of these parameters to gauge performance of a path provides an indirect measure of network performance. These parameters may, in fact, have no correlation to actual network performance.

For example, the detected occurrence of a large number of collisions and/or corrupted packets at a given router, based on information obtained from the router's local table, may or may not be an indication that paths to and from the router are bearing heavy network traffic which impacts network performance and the ability of the network to successively send and receive packets between two particular nodes.

SUMMARY OF THE INVENTION

A method is disclosed for managing a network slowdown. The method includes measuring a time for a packet to travel from a source node over a given path to a destination node in the network; comparing the time with a threshold for the path; and generating an event when the time exceeds the threshold, wherein the event identifies a hop along the path which exceeds a hop limit within the path.

A system is also disclosed for managing a network slowdown. The system includes a processor for measuring a time for a packet to travel from a source node over a given path to a destination node, and for comparing the time with the threshold for the path. A user interface is included for displaying a specific hop along the path which has exceeded a hop limit.

A computer readable medium containing a program for managing a network slowdown is disclosed, the program causing a computer processor to be configured to: measure a time for a packet to travel from a source node over a given path to a destination node in the network; compare the time with a threshold for the path; and generate an event when the time exceeds the threshold, wherein the even identifies a hop along the path which exceeds a hop limit within the path.

BRIEF DESCRIPTION OF THE DRAWING FIGURES

Features and advantages described herein will become more apparent to those skilled in the art upon reading the following detailed description in conjunction with the accompanying drawings, wherein.

DETAILED DESCRIPTION

Figure 1:
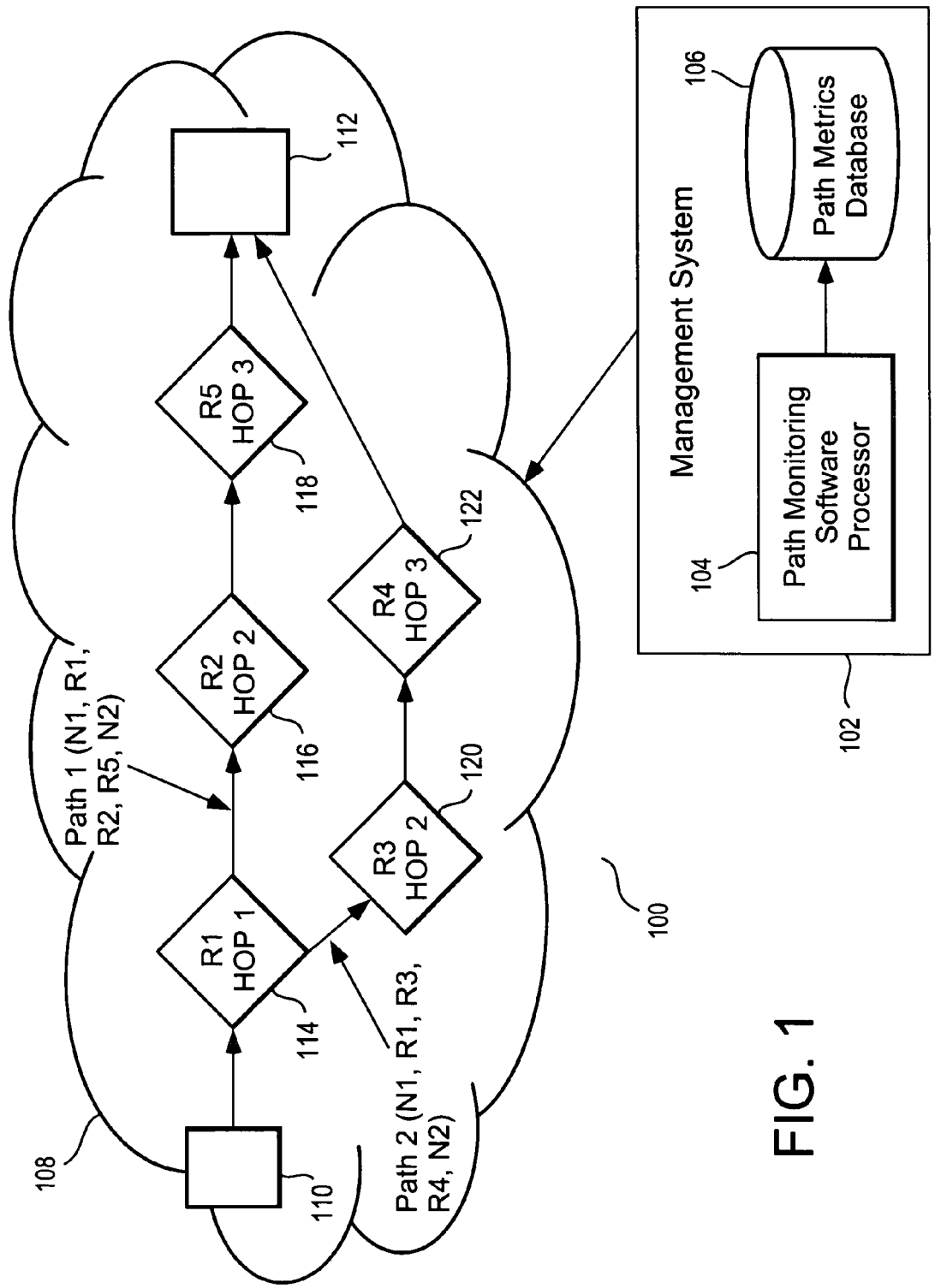
FIG. 1 shows an exemplary system for managing a network slowdown.

FIG. 1 illustrates an exemplary system 100 for managing a network slowdown. The system 100 includes a management system 102 having a processor, such as a computer processor 104, and an associated memory 106 used, for example to store a database of network related information. The processor 104 performs a computer process which can be stored on a computer readable medium. This program can include path monitoring software to cause the computer processor to be configured to perform the processes described herein.

In the FIG. 1 example, a means such as the processor 104 is provided for measuring a time, such as a roundtrip time, for a packet (i.e., any information packet) to travel from a source node over a given path to a destination node. The path constitutes a tracing route within the network being monitored.

The processor 104 compares the time with a threshold for the path. The processor can generate an event, such as an SNMP event, when the roundtrip time exceeds the threshold. The event can, for example, identify a hop along the path which exceeds a hop limit.

A user interface, represented as a means such as display 108, can be associated with the management system for identifying (e.g., displaying) a hop which has exceeded a hop limit. In the FIG. 1 embodiment, a portion of a network is displayed as a network cloud. However, those skilled in the art will appreciate that any portion of the network can be displayed. Alternatively, or in addition, sufficient information is conveyed on the display to identify the location, or locations, of a network slowdown. The information can be displayed graphically as shown in FIG. 1, or can be displayed textually, or can be provided to the user in any desired format.

To assist in an understanding of the operation of an exemplary embodiment, a portion of the network displayed in FIG. 1 includes two nodes and multiple routers located among two different paths. An exemplary manner by which the two paths are monitored will now be described. In the displayed portion of a network, a first node (N1) is labeled element 110 and can, for example, serve as a source node. A second node (N2) labeled 112 can, for example, serve as a destination node for a packet being transmitted from N1. The display shows that two paths exist between N1 and N2.

The first path, designated Path 1, includes three routers (R1, R2 and R5), labeled 114, 116 and 118. A second path (Path 2) includes the router R1, and two additional routers (R3, R4) designated 120 and 122. Thus, a packet transmitted from a source node N1 to a destination node N2 will pass through three hops along either Path 1 or Path 2. However, the actual routers which participate in the second and third hops will differ.

Exemplary embodiments maintain a history of packet travel results, referenced herein as traceroute results, between network nodes, such as between N1 and N2. Results of the traceroute can be stored in a path metrics database of the memory 106. The memory 106 can be configured using any known memory device, including, but not limited to any volatile and/or non-volatile memory. In addition, the memory can be configured to store the data in any desired fashion including, but not limited to a first-in first-out (FIFO) order.

Figure 2:
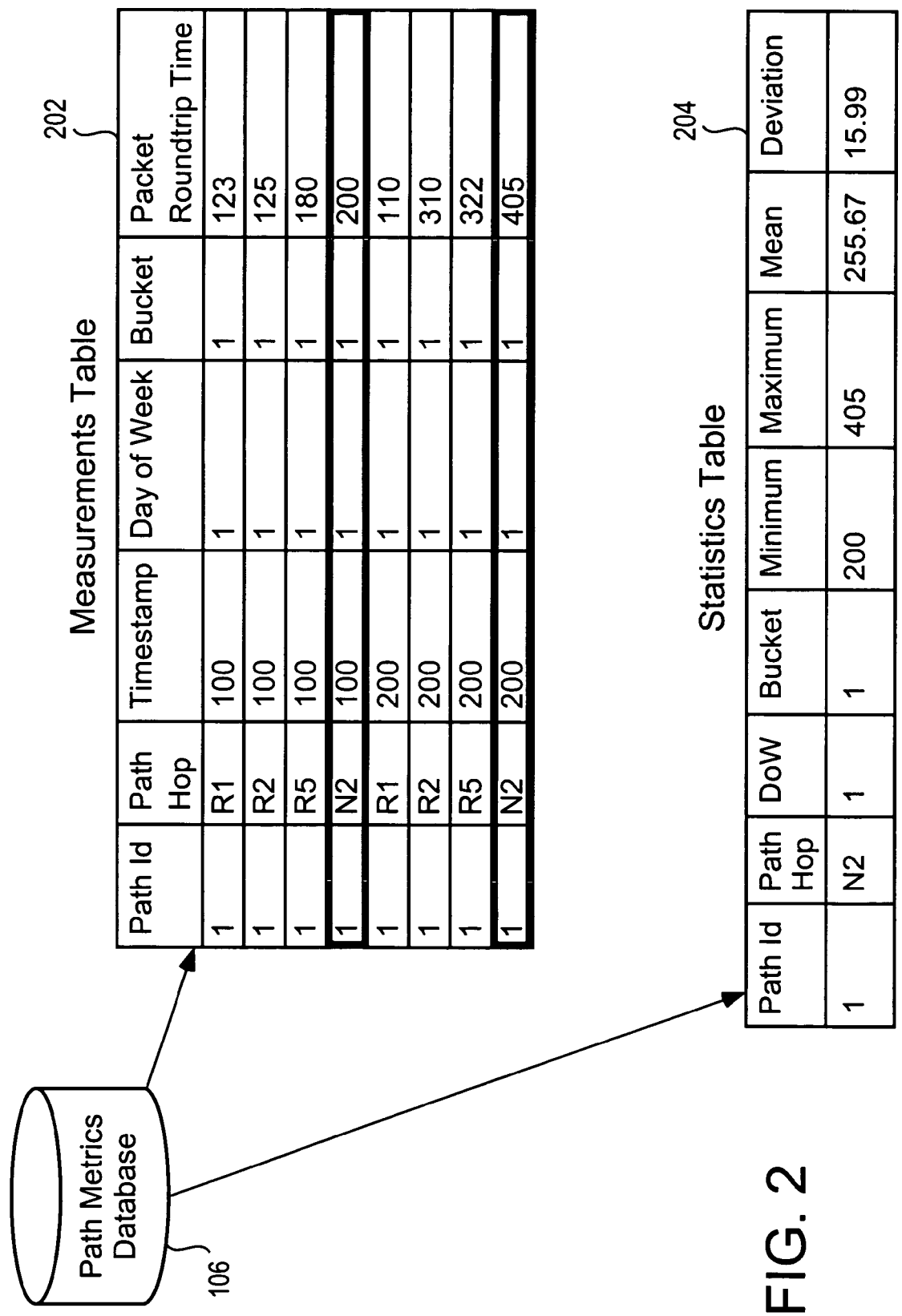
FIG. 2 shows exemplary tables associated with a database used in the FIG. 1 system.

FIG. 2 illustrates an exemplary data model by which traceroute results collected according to the exemplary FIG. 1 embodiment can be stored. As shown in FIG. 2, the path metrics database of memory 106 includes a measurements table 202 and a statistics table 204. Exemplary embodiments store a history of traceroute results based on, for example, a day of the week and a time of day. Using this information, a baseline packet response can be established to assist in recognizing when a network connection, such as a particular hop, has slowed from an expected baseline. The exact location in a network path where a slowdown is occurring (e.g., a specific hop) can be detected and identified using, for example, a designation of the affected hop. Additional related information such as, but not limited to, a source node identifier, a destination identifier and any other desired information associated with the network slowdown can be provided to the user as well. All of this information can be correlated and displayed to the user as an event identifier.

To store information, such as roundtrip time of an information packet in the memory as a function of time of day, the FIG. 2 data model can contain within the memory bins, or buckets, for each of plural designated time intervals. Using the stored information, slowdown information (also referred to herein as brownout information), can be generated and displayed to the user. Thus, exemplary embodiments collect information from the network, format the information, and use the information to determine the existence of a slowdown.

An exemplary manner by which information is collected is as follows. An exemplary method performed by the management system 102 traces a route to selected destinations, such as a route from N1 to N2, and stores the packet roundtrip times between each hop along the path based on the day of the week and the time of day that the traceroute operation was performed (e.g., initiated or completed). Of course, those skilled in the art will appreciate that any classification of the roundtrip times can be used to categorize them. In an example described herein, the roundtrip times are calculated as a function of the time required for packet to travel from one node (e.g., N1) to a second node (e.g., R2), combined with time required for the return packet, for example in the form of an acknowledgment packet, to travel from the second node R2 back to the first node N1. Each day is broken into eight buckets of three hours each, totaling twenty-four hours.

In an exemplary embodiment, midnight to 3:00 a.m. is a first bucket, 3:01 a.m. to 6:00 a.m. is a second bucket, and so forth. Thus, the results of a traceroute that occurs (e.g., is initiated, or alternatively is completed) at 11:16 a.m. on Tuesday is stored in Tuesday's bucket 4. By placing each traceroute result in a bin associated with a timestamp and a day of the week, different thresholds can be used for a given path which will take into account increases and decreases in network traffic that are associated with peak and off-peak periods of use.

A bucket contains a predetermined number, such as 24, measurements, although this parameter can be configurable by the user as a parameter, such as a "BUCKET_SIZE" parameter. The measurements can be stored using a first-in, first-out moving window, such that the oldest measurement is deleted to make room for the most recent measurement.

The storage can be refined to include other information, such as path and hop information. For example, there can be a Tuesday bucket for each hop in each path to the destination(s). If there is more than one path to a destination, data from a first path will be separated from data for the other path.

The measurements table 202 of FIG. 2 illustrates a data model which includes columns designated: Path ID, Path Hop, Timestamp, Day Of Week, Bucket, and Packet Roundtrip Time. The measurements table 202 contains information associated with communications of packets along the Path 1 between nodes N1 and N2 as displayed in FIG. 1. Thus, timestamp information and roundtrip time of the packet for each hop along Path 1 is designated in the measurements table 202. Similar information can be collected and stored in the database for all paths of the network. Statistical information associated with each path can also be determined on-the-fly, in real time, and optionally stored in a statistics table 204 of FIG. 2.

As new data is stored in the database, a threshold can be repeatedly recalculated for each hop using information from the statistics table. Network packet times are considered to follow a Poisson distribution, such that a standard deviation can be calculated, or more accurately, approximated, using the square root of the mean. A default threshold "L" can be used. For example, in an exemplary embodiment, a default threshold "L" can be "mean+3*standard deviation" or "$L=M+(3*SQRT(M))$". In this latter equation, the value of 3 is designated: BROWNOUT_NUM_DEVIATIONS, and can be configured by the user. Of course, any other suitable default threshold can be established using any fixed and/or variable parameters in any desired equation.

For each new trace, an exemplary method looks at packet roundtrip time to the destination node and compares the resultant overall roundtrip time to the associated limit. If the limit is exceeded, the program performed by the management system 102 can initiate a thread which will, by default, ping the destination in accordance with a set protocol to verify that a performance problem exists. In an exemplary embodiment, a destination can be pinged once per minute for fifteen minutes, where fifteen corresponds to a configurable variable: BROWNOUT_NUM_SAMPLES. If a configurable number of samples exceeding the threshold (e.g., a configurable variable: BROWNOUT_BAD_SAMPLES) exists, a performance problem can be considered to exist. For example, eight or more bad samples of pinged roundtrip times, in the case where fifteen samples have been taken, can be considered to signal a performance problem (e.g., brownout) with respect to a particular path. The threshold used can be the same as, or different from, the initial threshold used to initiate the ping process.

To more specifically identify the cause of the brownout, the methodology described herein can examine the last packet time for each hop along the path and compare that time to the calculated limit for that hop. For a hop time that has exceeded its specific limit, it can be assumed that a spike in packet times is occurring between that hop and the one before it. For example, if the hop time for hop number three along Path 1 of the FIG. 1 network is higher than its limit, the spike can be considered to have occurred between hop 2 and hop 3. That is, if the roundtrip packet times between N1 and R1, and between N1 and R2 are normal, while the packet time from N1 to R5 is abnormally large, then a slowdown can be considered to exist between R2 and R5. A brownout event can then be generated identifying the source, the destination and the hop or hops where the spike in delay appears to have occurred.

Figure 3:
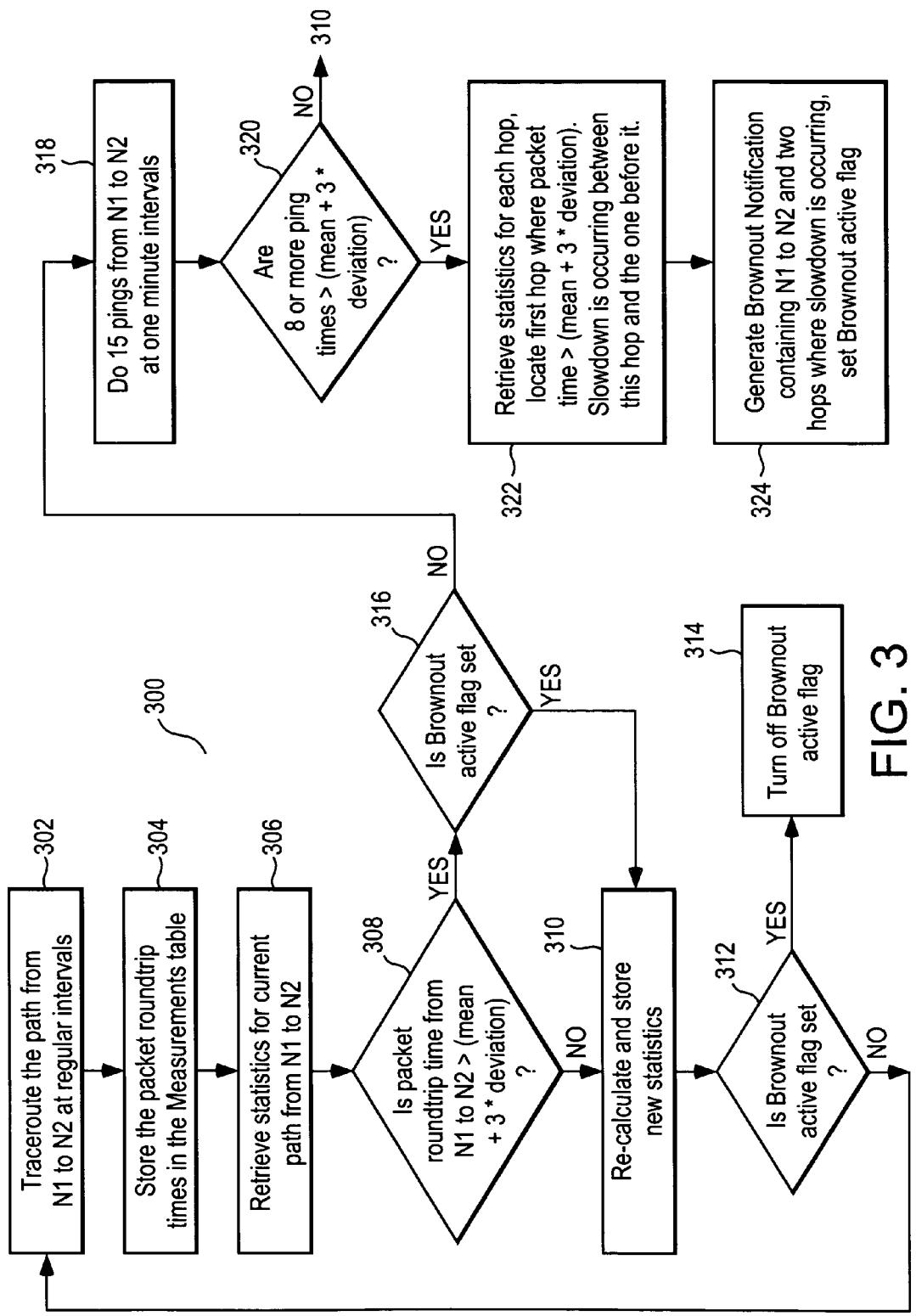
FIG. 3 shows an exemplary process flow of a method for managing a network slowdown in accordance with an exemplary embodiment.

The foregoing operation is illustrated in the FIG. 3 process flow 300. In block 302, a traceroute operation is performed on a path from N1 to N2 at regular intervals. In block 304, the packet roundtrip times are stored in the measurements table 202. To perform a threshold limit calculation, statistics for the current path from N1 to N2 are retrieved in block 306 from the statistics table 204 of FIG. 2.

The statistics table 204 can include a data model configured with columns labeled: Path ID, Path Hop, Day of Week (DOW), Bucket, Minimum Roundtrip Time, Maximum Roundtrip Time, Mean Roundtrip Time and Standard Deviation. For example, for the hop from the router R5 to the node N2, at a first timestamp on a first day of the week, packet roundtrip time was 200, whereas at a second timestamp 200 on the same day, the roundtrip time was 405. Although the times are relative, they can, for example, be considered to be in milliseconds, or any other suitable unit of measurement. The statistics table 204 includes the minimum and maximum times which, because there are only two times included in the measurements table 202, correspond to 200 and 405 milliseconds, respectively. The mean for the hop from N1 to N2, based on information in FIG. 2, is calculated as 255.67, with the standard deviation being 15.99.

In block 308 of the process flow 300, the stored and/or calculated information is used to determine whether the packet roundtrip time from N1 to N2 exceeds a value which corresponds to the default value: (mean+3*standard deviation). If not, the process flows to block 310 to recalculate and store new statistics.

In decision block 312, a determination is made as to whether a brownout active flag is set. If not, operation returns to repeatedly calculate packet roundtrip times for continued monitoring of a brownout condition. Alternately, if a brownout active flag has been previously set, representing that a brownout has occurred and that the user has been already notified, the brownout active flag can be deactivated in block 314. At this point, network monitoring can be discontinued for the path being examined until the network administrator addresses the identified performance problem.

Returning to decision block 308, where a packet roundtrip time has exceeded a threshold, and a brownout active flag has not already been set in decision block 316, process flows to block 318 to perform a more in depth investigation into the possible existence of a performance issue, such as a brownout condition.

In block 318, the parameter BROWNOUT_NUM_SAMPLES has been set to 15, such that 15 pings are performed from N1 to N2 at one minute intervals. Decision block 320 determines whether eight or more roundtrip ping times exceed the threshold for roundtrip communications between N1 to N2. If not, the process can flow to any of the blocks 302-312 (e.g., block 310). Otherwise, process flows to block 322 to retrieve statistics for each hop along the path between N1 and N2. The first hop where packet time (e.g., one directional time and/or roundtrip time) exceeds the threshold for that hop (e.g., mean+3*standard deviation) is used to indicate that a slowdown is occurring between this hop and the one before it for communications between N1 to N2.

In block 324, a brownout notification can be conveyed to the user as one example of a performance issue. This notification can be conveyed in any desired fashion including, but not limited to, via use of the FIG. 1 display 108. The notification can contain information such as, but not limited to, the source node N1, the destination node N2 and the identification of the two hops where the slowdown is occurring. At this time, the brownout active flag can be set to alert the user.

Once a brownout flag has been generated as an event, the process can wait a predetermined time (e.g., 24 hours), as configured using a user configurable BROWNOUT_INTERVAL, before generating a new event for a particular probed location and destination combination.

According to exemplary embodiments, a configuration file, referred to herein as: pdconfig.xml can be made available to the network administrator. Configurable variables discussed herein include, without limitation: BUCKET_SIZE=24; BROWNOUT_NUM_DEVIATIONS=3; BROWNOUT_NUM_SAMPLES=15; BROWNOUT_BAD_SAMPLES=8; and BROWNOUT_INTERVAL=24 HOURS (86400000 milliseconds). Of course any desired configuration variables, having any desired values, can be used.

Exemplary embodiments are not limited to a single source or destination. For example, distributed sources (probes) can be configured to each include multiple destinations. Any pair of nodes in a network can be monitored to precisely identify the location of a network slowdown.

Exemplary embodiments can identify when a network performance issue, such as a brownout, has occurred and an exact location of that occurrence. As such, troubleshooting efforts can be focused on specific network connections, to improve the efficiency in network communications and to reduce time to repair a faulty path.

The foregoing method of FIG. 3 is configured in the following code:

```
Main( )
{
    Int minuteCount = 0;
    For(;;)
    {
        if(minuteCount>traceinterval)
        {
            new Thread DoTraceroute(N1, N2);
            minuteCount = 0;
        }
        sleep(60);
        minuteCount++;
    }
}
Class Do Traceroute(N1, N2) extends Thread
{
    Object hops = Trace(N1,N2);
    Object stats = GetStats(N1,N2 hops.lasthop);
    float limit = stats.mean + 3 * stats.deviation;
    if (stats.activeFlag==
    false&&hops.lasthop.packetTime>limit)
    {
        new Thread Check Brownout(N1, N2, hops, limt)
    }
    Store(N1, N2, hops);
    CalculateAndStoreStats(N1, N2, hops);
}
Class Check Brownout(N1, N2, hops, limit) extends Thread
{
    int count = 0
    for (ictr = 1;ictr<16; ictr++)
    {
        float time = ping(N1,N2);
        if (time>limit) count++;
        sleep(60);
    }
```

-continued

```
    if (count>=8)
    {
        for (hop = 0;hop<hops.lasthop;hop++)
        {
            ObjecthopStats = GetStats(hop);
            If (hops.hop.packetTime>hotStats.mean +3 *
            hopStats.deviation)
            {
                SendSNMPBrownoutTrap(N1, N2, hop, hop-1);
                break;
            }
        }
    }
}
```

In the foregoing code, a traceroute operation for each given path (e.g., from N1 to N2) is performed at set intervals (e.g., every 60 minutes). At each traceroute, a thread is executed to analyze the path using a DoTraceroute Command. Where the possibility of a performance issue, such as a brownout, is detected for the path, a CheckBrownout command is performed, at which time an event, such as an SNMP trap, will be generated if a brownout is determined to have actually occurred.

Although the present invention has been described in connection with embodiments thereof, it will be appreciated by those skilled in the art that additions, deletions, modifications, and substitutions not specifically described may be made without departing from the spirit and scope of the invention as defined in the appended claims.

What is claimed is:

1. Method for managing a network slowdown, comprising:
measuring a time for a packet to travel from a source node over a given path to a destination node in the network;
comparing the time with a threshold for the path; and
generating an event when the time exceeds the threshold, wherein the event identifies a hop along the path which exceeds a hop limit within the path;
wherein historical measurements of traveling time for each hop of the path are divided into a plurality of bins; and
wherein the threshold and the hop limit are determined based on historical measurements in one of the plurality of bins.

2. Method according to claim 1, wherein the event identifies the source node and the destination node.

3. Method according to claim 1, wherein the time is a roundtrip time, the method comprising: storing the roundtrip time in memory.

4. Method according to claim 3, comprising:
storing the roundtrip time as a function of a time of day, wherein the memory includes the plurality of bins for each of plural designated time intervals.

5. Method according to claim 4, comprising:
storing the roundtrip time with data which indicates the path and the hop.

6. Method according to claim 3, comprising:
storing the roundtrip time with data which indicates the path and the hop.

7. Method according to claim 1, comprising:
calculating the threshold using a mean and a standard deviation of a roundtrip time for the hop.

8. Method according to claim 1, comprising: pinging the destination node when the threshold has been exceeded.

9. Method according to claim 8, wherein the pinging of the destination node is performed a predetermined number of times.

10. Method according to claim 9, wherein the threshold is determined to have been exceeded when a set number of pings results in a roundtrip time which exceeds a roundtrip time limit.

11. Method according to claim 1, comprising:
waiting a fixed time interval, subsequent to generating the event, before generating another event for the path between the source node and the destination node.

12. Method according to claim 1, comprising: generating an event which identifies the hop and a preceding hop.

13. System for managing a network slowdown, comprising:
a processor for measuring a time for a packet to travel from a source node over a given path to a destination node, and for comparing the time with the threshold for the path; and
a user interface for displaying a specific hop along the path which has exceeded a hop limit;
wherein historical measurements of traveling time for each hop of the path are divided into a plurality of bins; and
wherein the threshold and the hop limit are determined based on historical measurements in one of the plurality of bins.

14. System according to claim 13, comprising: a memory for storing a roundtrip time of the packet.

15. System according to claim 14, wherein each roundtrip time is associated in a data model of the memory with a time of day and with a day of week.

16. A computer readable medium containing a program for managing a network slowdown, the program being computer executable instructions for causing a computer processor to be configured to:
measure a time for a packet to travel from a source node over a given path to a destination node in the network;
compare the time with a threshold for the path; and
generate an event when the time exceeds the threshold, wherein the event identifies a hop along the path which exceeds a hop limit within the path;
wherein historical measurements of traveling time for each hop of the path are divided into a plurality of bins; and
wherein the threshold and the hop limit are determined based on historical measurements in one of the plurality of bins.

17. Computer readable medium according to claim 16, wherein the event identifies the source node and the destination node.

18. Computer readable medium according to claim 16, wherein the time is a roundtrip time, and the program causes the computer processor to be configured to: store the roundtrip time in memory.

19. Computer readable medium according to claim 18, wherein the program causes the computer processor to be configured to:
store the roundtrip time as a function of a time of day, wherein the memory includes the plurality of bins for each of plural designated time intervals.

20. Computer readable medium according to claim 19, wherein the program causes the computer processor to be configured to:
store the roundtrip time as a function of a path.

21. Computer readable medium according to claim 18, wherein the program causes the computer processor to be configured to:
store the roundtrip time with data which indicates the path and the hop.

22. Computer readable medium according to claim 16, wherein the program causes the computer processor to be configured to:
  calculate the threshold using a mean and a standard deviation of a roundtrip time for the hop.

23. Computer readable medium according to claim 22, wherein the program causes the computer processor to be configured to: generate an event which identifies the hop and a preceding hop.

24. Computer readable medium according to claim 23, wherein any pair of nodes in a network can be monitored to identify a location of network slowdown.

25. Computer readable medium according to claim 16, wherein the program causes the computer processor to be configured to:
  ping the destination node when the threshold has been exceeded.

26. Computer readable medium according to claim 25, wherein the pinging of the destination node is performed a predetermined number of times with an interval selected by a user, for comparing multiple roundtrip times within the threshold.

27. Computer readable medium according to claim 26, wherein the threshold is determined to have been exceeded when a set number of pings results in a roundtrip times which exceed a roundtrip time limit.

28. Computer readable medium according to claim 16, comprising:
  waiting a fixed time interval, subsequent to generating the event, before generating another event for the path between the source node and the destination node.

29. Apparatus for managing a network slowdown, comprising:
  means for measuring a time for a packet to travel from a source node over a given path to a destination node in the network, comparing the time with a threshold for the path, and generating an event when the time exceeds the threshold, wherein the event identifies a hop along the path which exceeds a hop limit within the path; and
  means for displaying a specific hop along the path which has exceeded a hop limit,
  wherein historical measurements of traveling time for each hop of the path are divided into a plurality of bins, and
  wherein the threshold and the hop limit are determined based on historical measurements in one of the plurality of bins.

* * * * *